(12) United States Patent
Yu

(10) Patent No.: US 12,494,936 B2
(45) Date of Patent: Dec. 9, 2025

(54) AUTOMATICALLY MATCHING SYSTEM AND METHOD FOR INTELLIGENT DEVICES

(71) Applicant: INVENTEC APPLIANCES CORPORATION, New Taipei (TW)

(72) Inventor: Li Yu, New Taipei (TW)

(73) Assignee: Inventec Appliances Corp., New Taipei (TW)

( * ) Notice: Subject to any disclaimer, the term of this patent is extended or adjusted under 35 U.S.C. 154(b) by 78 days.

(21) Appl. No.: 18/529,080

(22) Filed: Dec. 5, 2023

(65) Prior Publication Data

US 2025/0132944 A1 Apr. 24, 2025

(30) Foreign Application Priority Data

Oct. 19, 2023 (CN) .......................... 202311362381.3

(51) Int. Cl.
*G06F 15/173* (2006.01)
*H04L 12/28* (2006.01)
(52) U.S. Cl.
CPC ........ *H04L 12/2807* (2013.01); *H04L 12/283* (2013.01)
(58) Field of Classification Search
CPC ............... H04L 12/2807; H04L 12/283; H04L 12/2816; H04L 12/2823; H04L 12/2829; H04L 12/2809
See application file for complete search history.

(56) References Cited

U.S. PATENT DOCUMENTS

| | | | |
|---|---|---|---|
| 9,886,723 B1 * | 2/2018 | Devereaux ............. | G06Q 10/20 |
| 10,181,160 B1 * | 1/2019 | Hakimi-Boushehri ..................... G08B 21/20 |
| 11,824,677 B2 * | 11/2023 | Li ........................... | G08C 17/02 |
| 2021/0239831 A1 * | 8/2021 | Shin ....................... | G01S 13/886 |
| 2021/0266326 A1 | 8/2021 | Chen et al. | |
| 2022/0334543 A1 * | 10/2022 | Zhang .................... | G05B 15/02 |

FOREIGN PATENT DOCUMENTS

CN 115644739 A 1/2023

OTHER PUBLICATIONS

First Office Action mailed to Corresponding Taiwanese Patent Application No. 112148844 dated Nov. 25, 2024.

* cited by examiner

*Primary Examiner* — Duyen M Doan
(74) *Attorney, Agent, or Firm* — Rosenberg, Klein & Lee

(57) ABSTRACT

An automatically matching system for intelligent devices comprises an intelligent device, at least one sensor, and a matching device. The intelligent device executes an intelligent function and includes at least one input property. The at least one sensor comprises at least one output property and outputs a sensing value. The matching device is connected to the intelligent device and the at least one sensor to receive the at least one input property of the intelligent device and the at least one output property of at least one sensor. Wherein, the matching device makes the intelligent device and the at least one sensor in a group when the at least one input property matches the at least one output property. The intelligent device in the group is configured to execute and adjust the intelligent function according to the sensing value of the at least one sensor.

10 Claims, 6 Drawing Sheets

AUTOMATICALLY MATCHING SYSTEM AND METHOD FOR INTELLIGENT DEVICES

BACKGROUND OF THE INVENTION

1. Field of the Invention

The present invention relates to an automatic matching system and an automatic matching method, and more particularly, to an automatic matching system and method for automatically matching intelligent device and surrounding sensors.

2. Description of the Prior Art

The process of adding the information and data of the intelligent devices to the intelligent home system is to import the brand and model one by one into the central control host of the intelligent home system. The intelligent devices can only be used and execute the intelligent function after the settings are completed. However, when consumers purchase more intelligent devices, they need to spend a lot of time on setting the information and data for each new intelligent device. Even when consumers move into new houses, it is inconvenient to reset up new environmental parameters, the information and data for each intelligent device. In addition, some control rules and parameters are complex, and it is difficult for users to set up by themselves. Although there are some companies that provide service to assist with planning and setup, it is difficult to increase the utilization rate due to the high cost.

Therefore, it is necessary to provide a setting method and system that is simple to set up, easy to operate, and can be adjusted by combining a variety of intelligent devices to make the intelligent home system more convenient and to improve consumption desire.

SUMMARY OF THE INVENTION

Therefore, the present invention provides an automatically matching system and method for intelligent devices to solve the problems with the prior art.

In one embodiment of the present invention, the automatically matching system for intelligent devices comprises an intelligent device, at least one sensor, and a matching device. The intelligent device includes at least one input property capable of executing an intelligent function. The at least one sensor includes at least one output property capable of outputting a sensing value corresponding to the at least one output property. The matching device is connected to the intelligent device and the at least one sensor, and is configured to receive and compare the at least one input property of the intelligent device with the at least one output property of the at least one sensor. Wherein, the matching device forms the intelligent device and the at least one sensor into a group when the at least one input property matches the at least one output property. Wherein, the intelligent device in the group is configured to execute and adjust the intelligent function according to the sensing value of the at least one sensor.

In another one embodiment of the present invention, the automatically matching method for intelligent devices comprises the following steps: a matching device receives and compares at least one input property of an intelligent device and at least one output property of at least one sensor. The matching device makes the intelligent device and the at least one sensor form a group when the at least one input property matches the at least one output property. The intelligent device in the group executes and adjusts the intelligent function according to the sensing value of the at least one sensor.

In summary, the automatically matching system and method of the present invention can automatically detects surrounding intelligent devices and sensors and make them form a group according to the same property through a matching device. Accordingly, consumers do not need to manually input the data of the intelligent device and the sensor one by one, so as to save a lot of time. Next, the automatically matching system and method of the present invention can adjust more than one property at the same time, which can be more suitable and meet the requirements for users to apply in the actual environment. In addition, the users can upload the customized intelligent rules by themselves or download other intelligent rules established from the cloud server, to adjust the better and more suitable parameters for the environment after using. Compared with the prior art, the present invention provides a setting method and system that is simple to set up, easy to operate and can combine multiple intelligent devices to process adjustments, so as to make the intelligent home system more convenient to use and improve consumption desire.

BRIEF DESCRIPTION OF THE APPENDED DRAWINGS

DETAILED DESCRIPTION OF THE INVENTION

Figure 1:
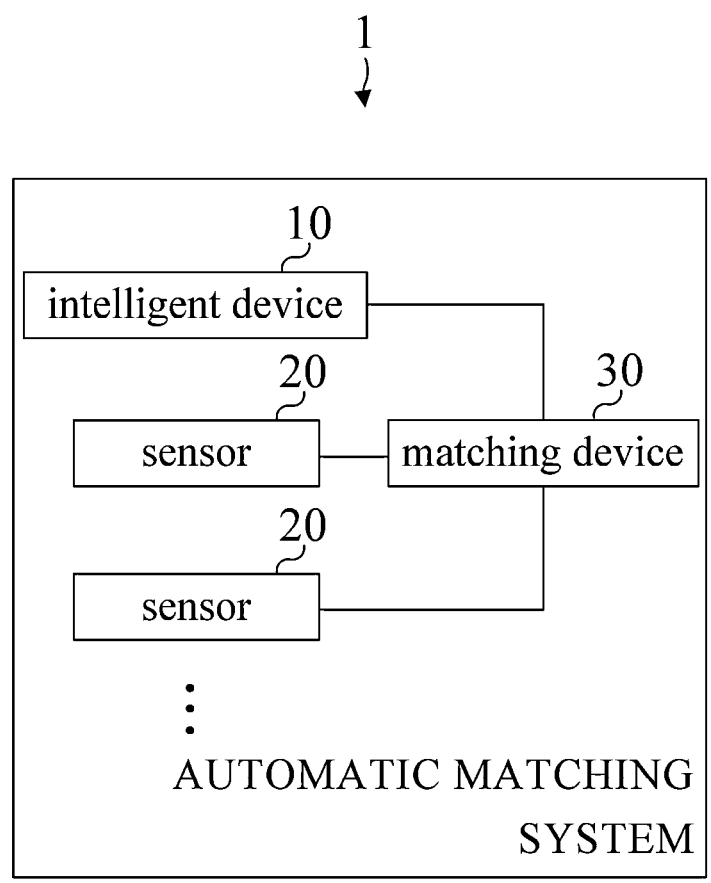
FIG. 1 is a schematic diagram illustrating an automatically matching system for intelligent devices according to an embodiment of the present invention.

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments.

Moreover, the devices in the figures are only used to express their corresponding positions and are not drawing according to their actual proportion.

In the description of the present invention, it is to be understood that the orientations or positional relationships of the terms "longitudinal, lateral, upper, lower, front, rear, left, right, top, bottom, inner, outer" and the like are based on the orientation or positional relationship shown in the drawings. It is merely for the convenience of the description of the present invention and the description of the present invention, and is not intended to indicate or imply that the device or component referred to has a specific orientation, is constructed and operated in a specific orientation, and therefore cannot be understood as limitations of the invention.

In the description of this specification, the description with reference to the terms "a specific embodiment", "another specific embodiment" or "parts of specific embodiments" etc. means that the specific feature, structure, material or feature described in conjunction with the embodiment include in at least one embodiment of the present invention. In this specification, the schematic representations of the above-mentioned terms do not necessarily refer to the same embodiment. Moreover, the described specific features, structures, materials or characteristics can be combined in any one or more embodiments in a suitable manner.

Please refer to FIG. 1. FIG. 1 is a schematic diagram illustrating an automatically matching system for intelligent devices according to an embodiment of the present invention. As shown in FIG. 1, the automatically matching system 1 for intelligent devices according to a specific embodiment of the present invention comprises an intelligent device 10, a sensor 20 and a matching device 30. The intelligent device 10 comprises at least one input property capable of executing an intelligent function. The sensor 20 comprises at least one output property capable of outputting a sensing value corresponding to the at least one output property. The matching device 30 is connected to the intelligent device 10 and the sensor 20, and the matching device 30 is configured to receive and compare the at least one input property of the intelligent device 10 with the at least one output property of the sensor 20. When the matching device 30 makes a comparison and concludes that the at least one input property matches the at least one output property, the intelligent device 10 and the sensor 20 having the same property are formed into a group. The intelligent device 10 in the group executes and adjusts the intelligent function according to the sensing value of the sensor 20. In practice, the intelligent device 10 can be any intelligent home device or industrial equipment; the sensor 20 can be a light sensor, a temperature sensor, a humidity sensor, etc., but it is not limited thereto. In addition, any intelligent device 10 with sensing function can also regard as a sensor, and the matching device 30 makes the intelligent device with sensing function and the other intelligent device in the group with the corresponding property to each other. It should be noted that the quantity of sensors shown in FIG. 1 is two sets, but it is not limited hereto in practice. The quantity of sensors can be determined according to the design or requirement. In practice, it is possible to make only one sensor in a group.

For example, there are three input properties such as brightness property, time property, and temperature property of an intelligent lamp (regard as an intelligent device 10 in this example) in one intelligent home system, and also there is a light sensor, a temperature sensor, a humidity sensor and a time controller (regard as a sensor 20) arranged around the intelligent lamp. The matching device 30 can connect the intelligent lamp, the light sensor, the temperature sensor, the humidity sensor and the time controller, and receive the input property of the intelligent lamp such as brightness property, time property and temperature property and the output property of each light sensor, temperature sensor, humidity sensor and time controller to compare. After comparison, the brightness output property of the light sensor matches the brightness input property of the intelligent lamp; the temperature output property of the temperature sensor matches the temperature input property of the intelligent lamp; and the time output property of the time controller matches the time input property of the intelligent lamp. However, the humidity output property of the humidity sensor does not match any input property of the intelligent lamp. According to the above comparison results, the matching device 30 makes the intelligent lamp, the light sensor, the temperature sensor and the time controller form a group. Therefore, the intelligent lamp can automatically adjust its lighting functions according to the values output by light sensors, temperature sensors and time controllers in the group at the same time, so as to be regarded as intelligent lighting functions. For example, the intelligent lamp can automatically turn on or turn off according to the ambient brightness value detected by the light sensor, adjust the color temperature according to the ambient temperature value detected by the temperature sensor, and set a function of time switch according to the time value outputted by the time controller (such as the cloud platform).

Next, for another example, there are three input properties such as time property, temperature property, and humidity property of an intelligent air conditioner (regard as an intelligent device 10 in this example), and also there is a light sensor, a temperature sensor, a time controller and a humidity sensor arranged around the intelligent air conditioner. The matching device 30 can connect all the above-mentioned devices and compare the input properties and the output properties of all devices. After comparison, the temperature output property of the temperature sensor matches the temperature input property of the intelligent air conditioner; the time output property of the time controller matches the time input property of the intelligent air conditioner; the humidity output property of the humidity sensor matches the humidity input property of the intelligent air conditioner. However, the brightness output property of the light sensor does not match any input property of the intelligent lamp. According to the above comparison results, the matching device 30 makes the intelligent air conditioner, the temperature sensor, the time controller and the humidity sensor form a group. Therefore, the intelligent air conditioner can automatically adjust its functions according to the values output by the temperature sensor, the time controller and the humidity sensor, so as to be regarded as intelligent air condition functions. For example, the intelligent air conditioner can adjust temperature according to the ambient temperature value detected by the temperature sensor to achieve a constant temperature effect, set a function of time switch according to the time value outputted by the time controller (such as the cloud platform) and adjust air volume according to the ambient detected by the humidity sensor.

In summary, each type of the intelligent devices can execute its intelligent function with corresponding sensors, automatically matched by the matching device. In this way, users do not need to set parameters, attributes or rules after installing intelligent devices, thereby avoiding situations when the intelligent devices cannot operate due to human errors (such as mistakenly inputting attributes or matching wrong sensors).

Figure 2:
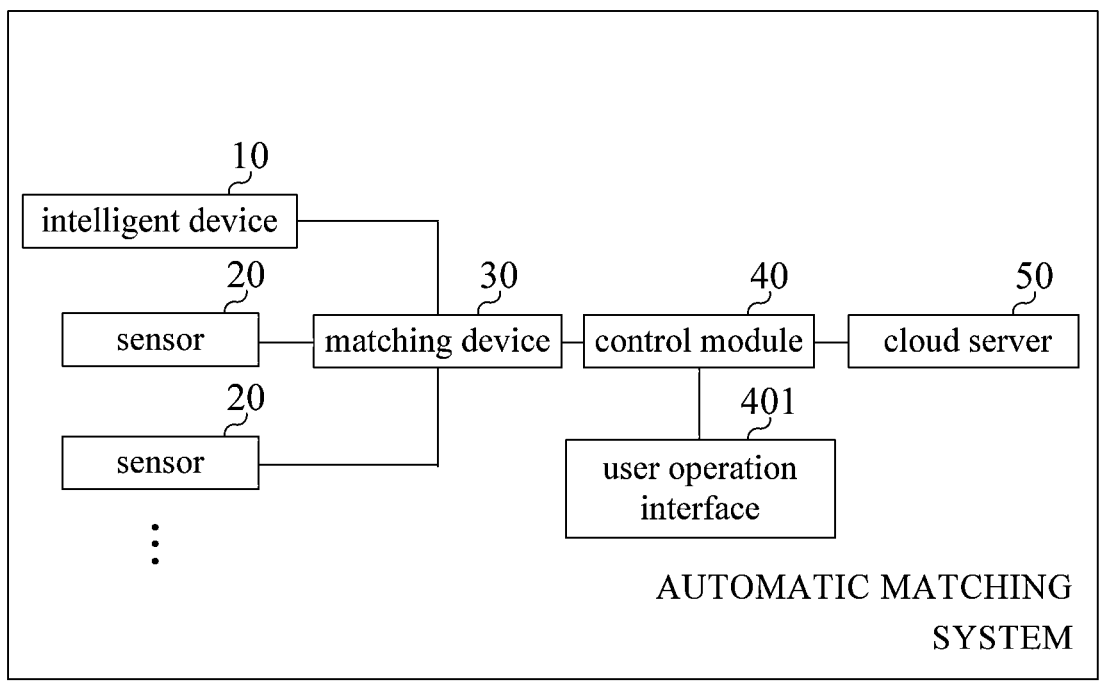
FIG. 2 is a schematic diagram illustrating an automatically matching system for intelligent devices according to another embodiment of the present invention.

In the aforementioned specific embodiments, the matching device can automatically match the intelligent device with the sensor so as to automatically complete the connection and control rules between the two without manually setting up by users, and it will be effectively reduce inconvenience for users when they set up new intelligent devices and renew the intelligent home systems after purchasing new intelligent devices. However, if the user is already familiar with how to set, the user may also want to adjust the intelligent rule from the intelligent device and the sensors in the group to generate a new intelligent rule they want. Please refer to FIG. 2. FIG. 2 is a schematic diagram illustrating an automatically matching system for intelligent devices according to another embodiment of the present invention. As shown in FIG. 2, the automatically matching system 2 for intelligent devices according to a specific embodiment of the present invention further comprises a control module 40 and a cloud server 50. The control module 40 is connected to the intelligent device 10, the sensor 20, the matching device 30 and the cloud server 50, and further includes a user operation interface 401. When the matching device 30 makes the intelligent device 10 and the sensors 20 form a group, the control module 40 is connected to the matching device 30 to receive the data from the group and provide appropriate intelligent rules according to the data for the intelligent device 10 to execute the intelligent function. In addition, the control module 40 can display the intelligent rules on the user operation interface 401 for the user to browse. The user can confirm whether to apply the intelligent rule from the control module 40 on the user operation interface 401, or modify and adjust the intelligent rule on the user operation interface 401 to obtain a customized intelligent rule. In detail, the user uses the user operation interface 401 to adjust the intelligent rule, recommended by the control module 40 to meet the environmental parameters of the user's personal preference (such as the temperature and humidity of the living room, the brightness of the light, the color temperature of the light, and the working time of the intelligent devices). The intelligent device 10 will adjust and execute the intelligent function according to the sensing value output by the sensor of the intelligent rule or the customized intelligent rule in the same group. In practice, the matching device 30 and the control module 40 can be installed in the same central control host, and both of them can be established in the central processing unit of a central control host at the same time to execute functions or be established in the different processing units of the central control host.

The intelligent rules recommended by the aforementioned control module 40 can be directly built-in in the control module 40, or be communicated with the cloud server 50 when receiving the data in the group of the matching device 30 and obtains recommended intelligent rules from the cloud server 50. On the other hand, when the user adjusts the intelligent rule to obtain a customized intelligent rule, the control module 40 can also upload the customized intelligent rule to the cloud server 50. Therefore, when another user purchases the same intelligent device and the same intelligent device, which will receive the same data in the group from the matching device 30, the cloud server 50 can provide the original intelligent rule and the customized intelligent rule for new users to choose. More users upload their customized intelligent rules, and then more choices are provided for new users to choose. In this way, after users purchased any kinds of intelligent devices, they can easily use intelligent devices without going through complicated setting procedures.

The above-mentioned grouping rule is by matching the input properties of the intelligent device with the output properties of the sensor. However, there may be multiple sensors with the same type in an area. Therefore, the relative position and distance between each sensor and the intelligent device are another condition for suitability in the group. The present of the invention can determine the relative position between the intelligent device 10 and the sensor 20 through the signal strength of the RSSI. RSSI is an ability target to receive signals. For example, there are three signal transmitters, regarded as sensors capable of outputting the signal, the three signal transmitters can detect and confirm the relative distance through the signal strength of the RSSI to each other in the same area. In the present embodiment, the intelligent device 10 and the sensor 20 can determine their positions through the signal strength of the RSSI, and the intelligent devices 10 and the sensor 20 are chosen in the group according to the closer position to each other also with same input property and output property to each other. In detail, the intelligent device 10 can obtain the signal strength of the RSSI between it and other surrounding devices. The sensors 20 of the same type but in different position can also obtain the RSSI signal strength between itself and other surrounding devices. The matching device 30 can not only detect the corresponding input property and output property of the intelligent device 10 and the sensor 20, but also select the intelligent device 10 and the sensor 20 with similar signal strength of the RSSI in the group. The intelligent device 10 and the nearby sensors 20 can be in the group instead of the farther sensors to avoid erroneous operations caused by the influence of the farther sensors.

For example, it is known that a first light sensor is installed in the user's bedroom, and a second light sensor is installed in the bathroom next to the bedroom. When the user purchased a new intelligent lamp, the new intelligent lamp is installed in the bedroom and connected to Wi-Fi. After the matching device 30 is connected to the new intelligent lamp, the matching device 30 will not only compare the input property of the new intelligent lamp with the output property of the first light sensor and the output property of the second light sensor, but also compare the signal strength of the RSSI to each other. The matching device 30 determines that the output property of the first light sensor and the second light sensor are brightness property, and all of them are corresponding to the property of the new intelligent lamp. However, the first light sensor and the new intelligent lamp are close to each other. The matching device 30 detects the similar signal strength of the RSSI between the first light sensor and the new intelligent lamp, so the matching device 30 preferentially selects the first light sensor and makes the new intelligent lamp and the first light sensor form a group, and further recommends the intelligent rule to the user. Therefore, the new intelligent lamp executes and adjusts the intelligent lighting function according to the brightness of the bedroom detected by the first light sensor.

Furthermore, by comparing the signal strength of the RSSI of the user's smart phone or smart wearable device, it can also determine the relative position between the user and the intelligent device when the user is holding the smart phone or wearing the smart wearable device. For example, the first intelligent lamp is installed in the living room and the second intelligent lamp is installed in the bedroom. When the RSSI signal strength of the user's smart phone or smart wearable device is close to the first intelligent lamp, the matching device determines that the user is in the living room, and makes the first intelligent lamp turn on. Then, when the user walks into the bedroom, the difference of signal strength of the RSSI between the user's smart phone or smart wearable device and the first intelligent lamp is getting larger, and the signal strength of the RSSI between the user's smart phone or smart wearable device and the second intelligent lamp is getting similar with each other. The matching device 30 determines the user is in the bedroom, so the second intelligent lamp is turned on and the first intelligent lamp is turned off.

As described above, by determining the relative position through the signal strength of the RSSI, body sensors can also be used to confirm the user's position. When the user passes through the effective detection area of the body sensor, the body sensors detect the relative position of the user through a built-in infrared ray, and make the body sensors and nearby intelligent devices form a group. Therefore, the intelligent devices can execute and adjust the intelligent function according to the body sensor and the nearby intelligent devices. For example, the user sets the body sensor to connect to the user's mobile device at first. Then, the user will know the movements of children or pets in the space and further adjust the intelligent functions.

Figure 3:
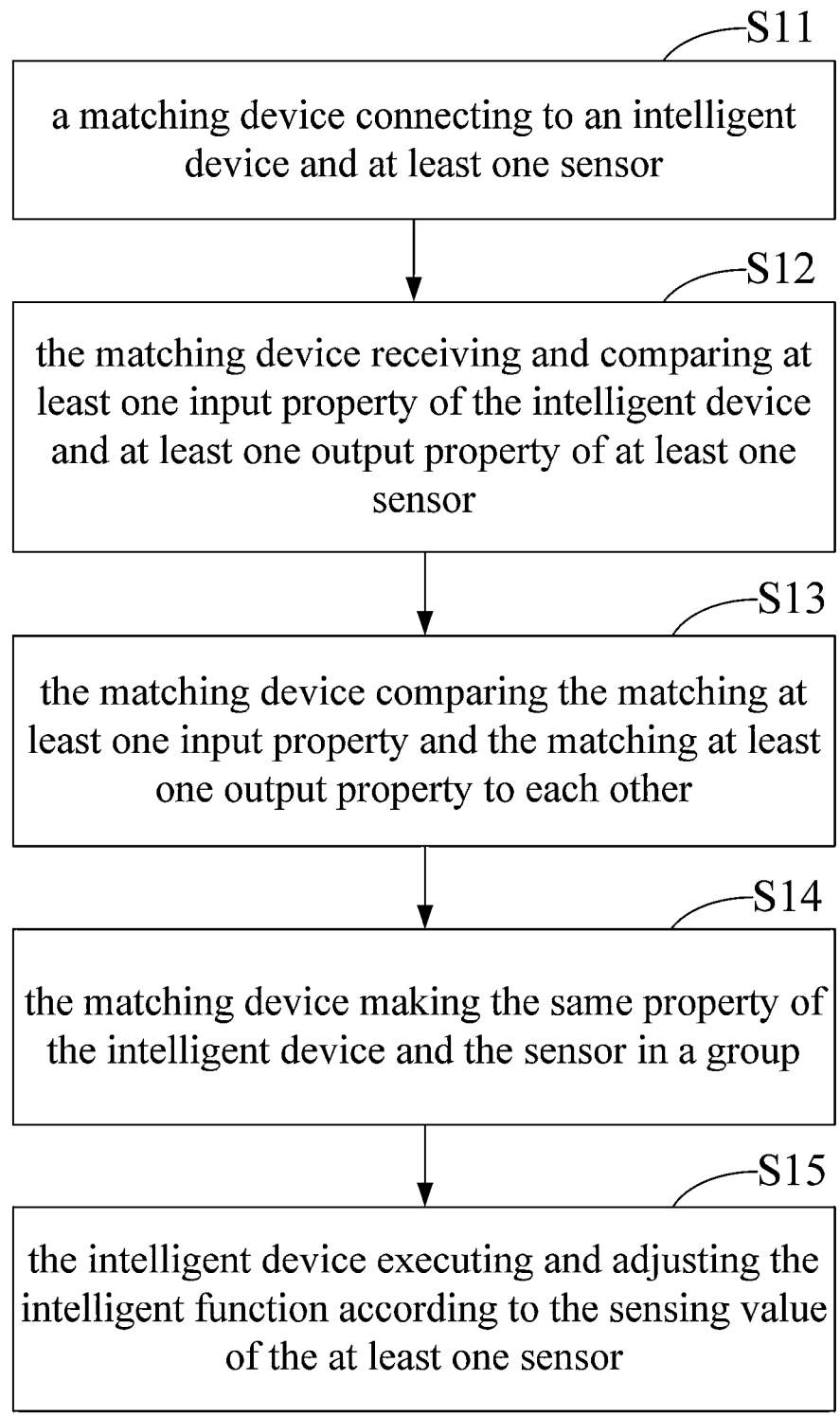
FIG. 3 is a flow chart illustrating an automatically matching method for intelligent devices according to an embodiment of the present invention.

Please refer to FIG. 3. FIG. 3 is a flow chart illustrating an automatically matching method for intelligent devices according to an embodiment of the present invention. It should be noted that each step of the automatically matching method for intelligent devices can be achieved through the automatically matching system 1 of the FIG. 1, so each step of the method of this present embodiment is explained below through each unit of the automatically matching system 1. As shown in FIG. 3, the automatically matching method for intelligent devices according to a specific embodiment of the present invention comprises the following steps of: step S11: a matching device 30 connecting to an intelligent device 10 and at least one sensor 20; step S12: the matching device 30 receiving and comparing at least one input property of the intelligent device 10 and at least one output property of at least one sensor 20; step S13: the matching device 30 comparing the matching at least one input property and the matching at least one output property to each other; step S14: the matching device 30 making the same property of the intelligent device 10 and the sensor 20 in a group; and step S15: the intelligent device 10 executing and adjusting the intelligent function according to the sensing value of the at least one sensor 20. In the present embodiment, the automatically matching method for intelligent devices can automatically match the at least one input property of the intelligent device 10 with the at least one output property of the sensor 20, and select them in the group, so as to make the intelligent device 10 execute and adjust the intelligent function according to the sensing value of the sensor 20 to reduce the situation of user setting errors.

Figure 4:
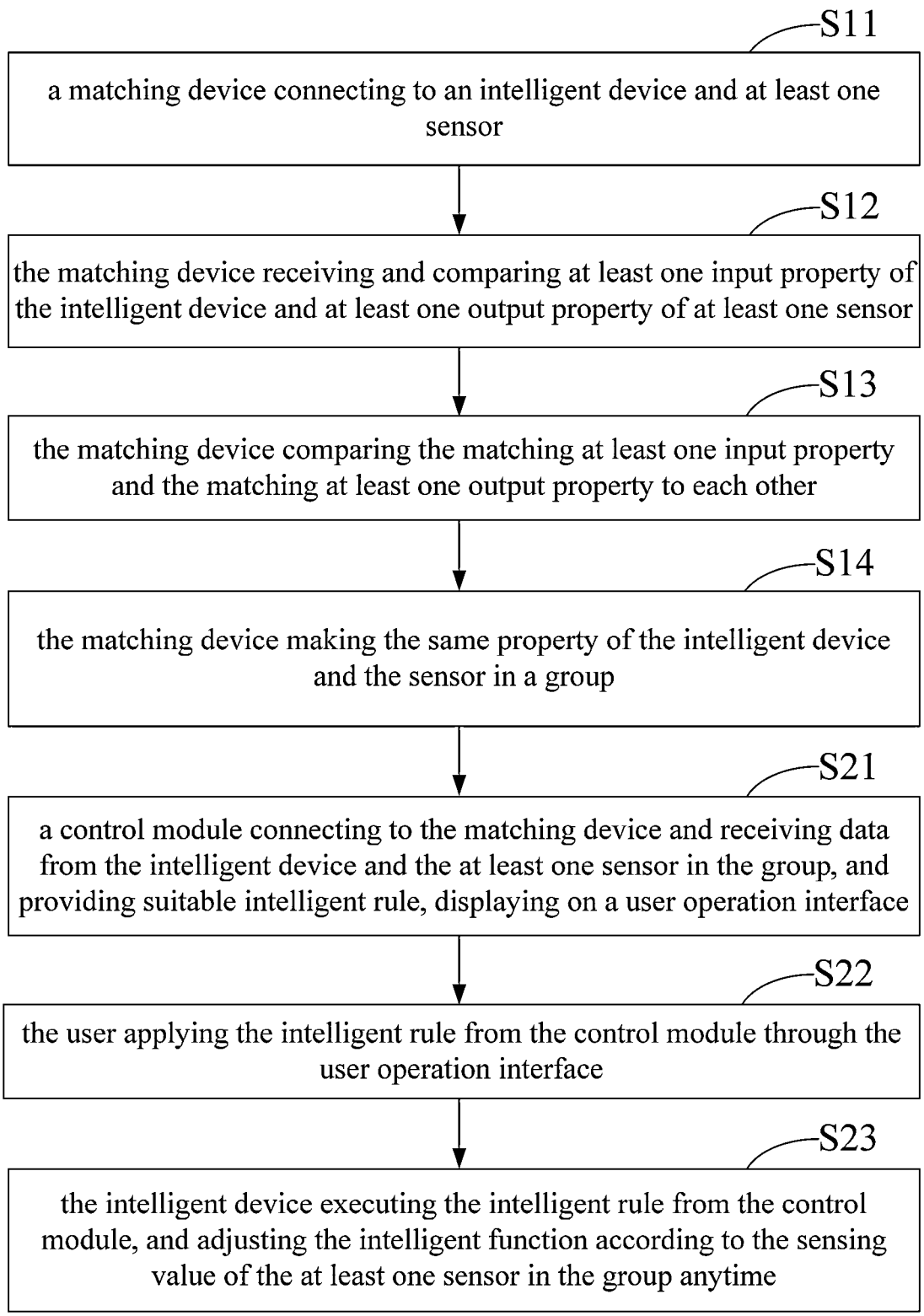
FIG. 4 is a flow chart illustrating an automatically matching method for intelligent devices according to another embodiment of the present invention.

Please refer to FIG. 4. FIG. 4 is a flow chart illustrating an automatically matching method for intelligent devices according to another embodiment of the present invention. It should be noted that each step of the automatically matching method for intelligent devices can be achieved through the automatically matching system 2 of the FIG. 2, so each step of the method of this present embodiment is explained below through each unit of the automatically matching system 2. As shown in FIG. 4, the automatically matching method for intelligent devices according to a specific embodiment of the present invention comprises the following steps of: step S11: a matching device 30 connecting to an intelligent device 10 and at least one sensor 20; step S12: the matching device 30 receiving and comparing at least one input property of the intelligent device 10 and at least one output property of at least one sensor 20; step S13: the matching device 30 comparing the matching at least one input property and the matching at least one output property to each other; step S14: the matching device 30 making the same property of the intelligent device 10 and the sensor 20 in a group; step S21: a control module 40 connecting to the matching device 30 and receiving data from the intelligent device 10 and the at least one sensor 20 in the group, and providing suitable intelligent rule, displaying on a user operation interface 401; step S22: the user applying the intelligent rule from the control module 40 through the user operation interface 401; and step S23: the intelligent device 10 executing the intelligent rule from the control module 40, and adjusting the intelligent function according to the sensing value of the at least one sensor 20 in the group anytime. In the present embodiment, some steps are roughly the same as to the corresponding steps in the previous specific embodiments. The difference from the previous specific embodiments is that the automatically matching method for intelligent devices in the present embodiment provides suitable intelligent rule through the intelligent device 10 and the sensor 20 in the group for the user can apply the suitable intelligent rule immediately after purchasing.

Figure 5:
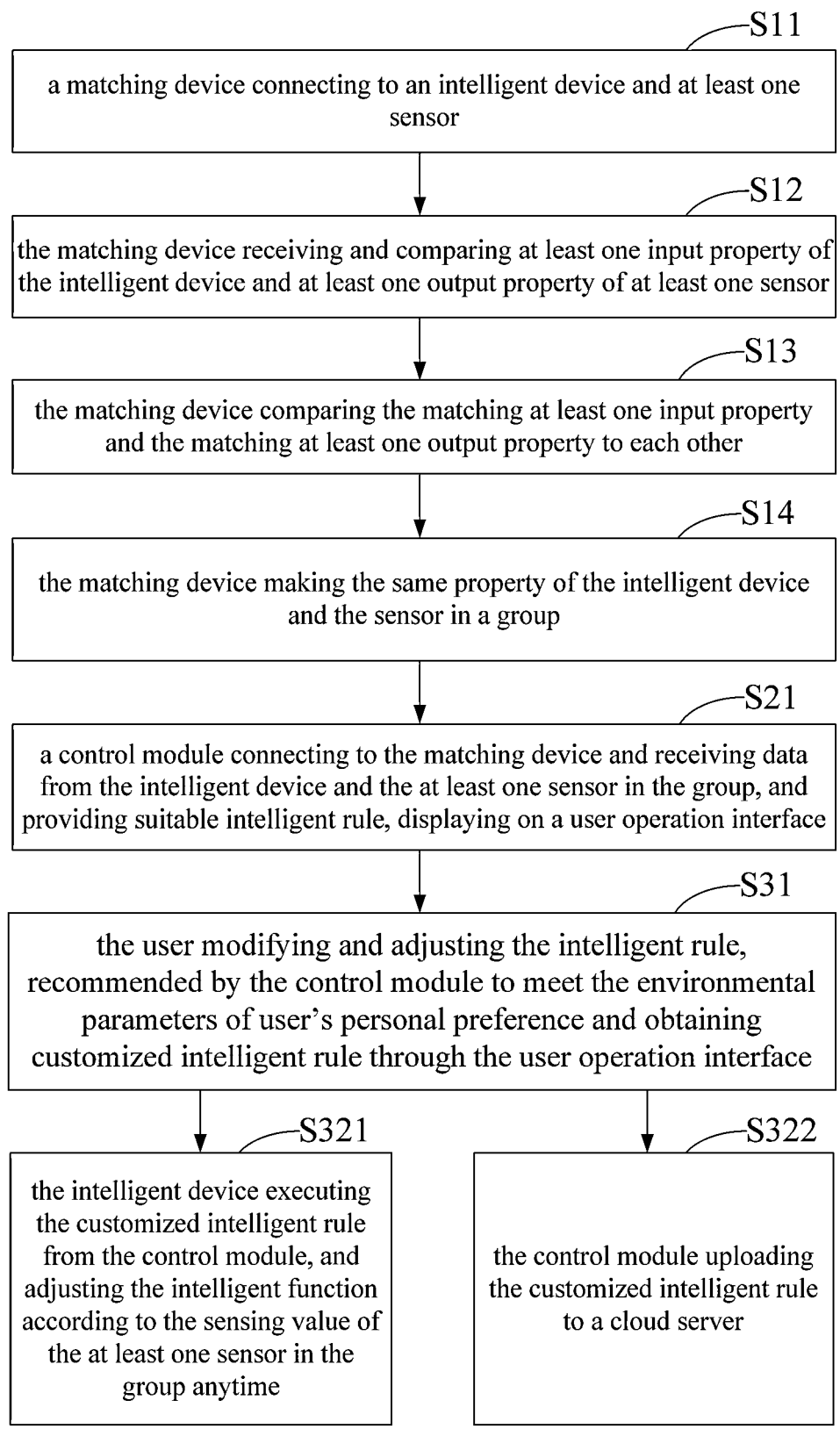
FIG. 5 is a flow chart illustrating an automatically matching method for intelligent devices according to another embodiment of the present invention.

Please refer to FIG. 5. FIG. 5 is a flow chart illustrating an automatically matching method for intelligent devices according to another embodiment of the present invention. It should be noted that each step of the automatically matching method for intelligent devices can be achieved through the automatically matching system 2 of the FIG. 2, so each step of the method of this present embodiment is explained below through each unit of the automatically matching system 2. As shown in FIG. 5, the automatically matching method for intelligent devices according to a specific embodiment of the present invention comprises the following steps of: step S11: a matching device 30 connecting to an intelligent device 10 and at least one sensor 20; step S12: the matching device 30 receiving and comparing at least one input property of the intelligent device 10 and at least one output property of at least one sensor 20; step S13: the matching device 30 comparing the matching at least one input property and the matching at least one output property to each other; step S14: the matching device 30 making the same property of the intelligent device 10 and the sensor 20 in a group; step S21: a control module 40 connecting to the matching device 30 and receiving data from the intelligent device 10 and the at least one sensor 20 in the group, and providing suitable intelligent rule, displaying on a user operation interface 401; step S31: the user modifying and adjusting the intelligent rule, recommended by the control module 40 to meet the environmental parameters of user's personal preference and obtaining customized intelligent rule through the user operation interface 401; step S321: the intelligent device 10 executing the customized intelligent rule from the control module 40, and adjusting the intelligent function according to the sensing value of the at least one sensor 20 in the group anytime; and step S322: the control module 40 uploading the customized intelligent rule to a cloud server 50. In the present embodiment, the user can further adjust the environmental parameters of personal preferences (such as the temperature and humidity of the living room, the brightness of the light, the color temperature of the light, and the length of time for starting the intelligent device) to generate the customized intelligent rule to meet their own preferences, and the customized intelligent rule after adjusting will be stored to the cloud server 50.

Figure 6:
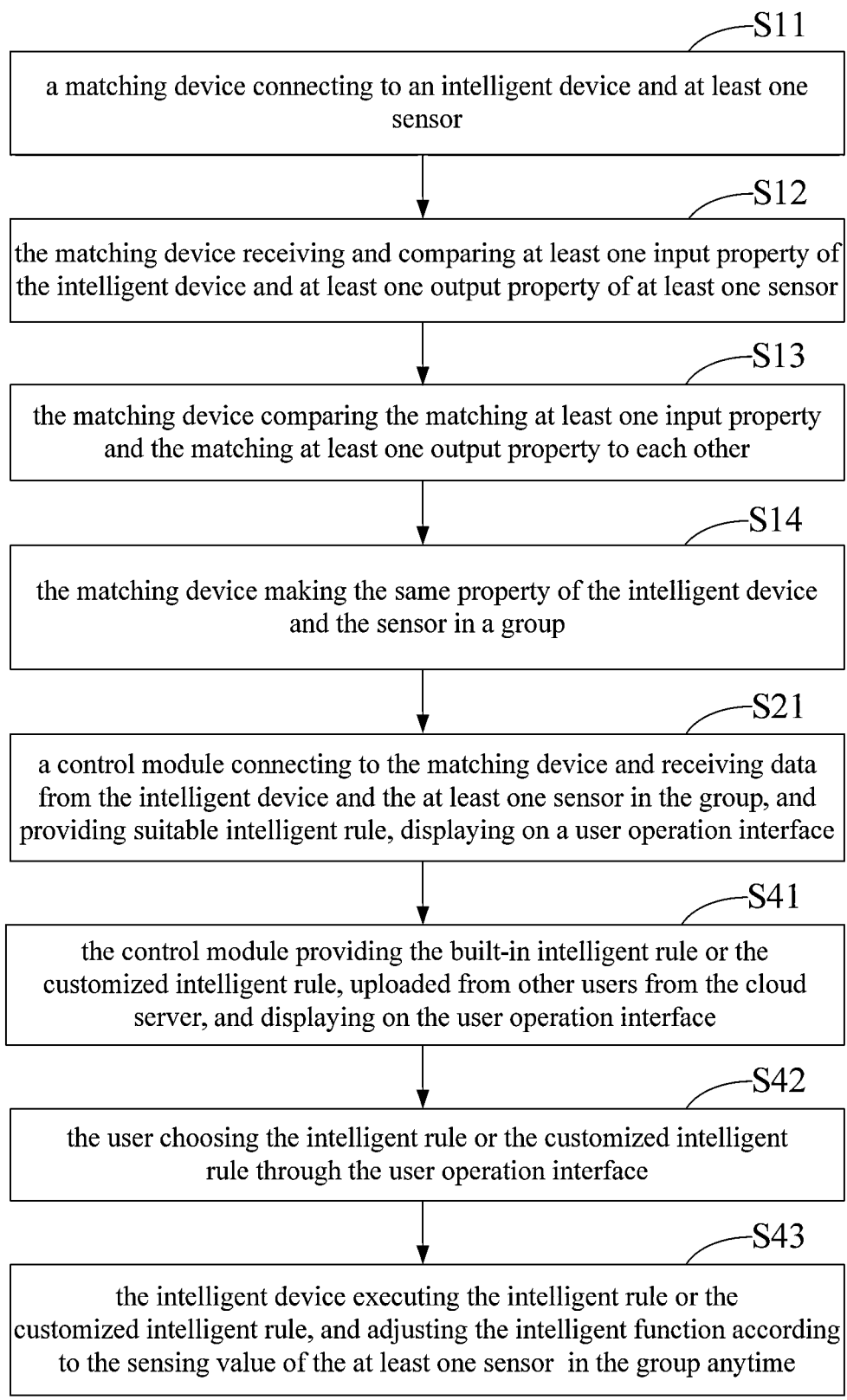
FIG. 6 is a flow chart illustrating an automatically matching method for intelligent devices according to another embodiment of the present invention.

Please refer to FIG. 6. FIG. 6 is a flow chart illustrating an automatically matching method for intelligent devices according to another embodiment of the present invention. It should be noted that each step of the automatically matching method for intelligent devices can be achieved through the automatically matching system 2 of the FIG. 2, so each step of the method of this present embodiment is explained below through each unit of the automatically matching system 2. As shown in FIG. 6, the automatically matching method for intelligent devices according to a specific embodiment of the present invention comprises the following steps of: step S11: a matching device 30 connecting to an intelligent device 10 and at least one sensor 20; step S12: the matching device 30 receiving and comparing at least one input property of the intelligent device 10 and at least one output property of at least one sensor 20; step S13: the matching device 30 comparing the matching at least one input property and the matching at least one output property to each other; step S14: the matching device 30 making the same property of the intelligent device 10 and the sensor 20 in a group; step S21: a control module 40 connecting to the matching device 30 and receiving data from the intelligent device 10 and the at least one sensor 20 in the group, and providing suitable intelligent rule, displaying on a user operation interface 401; step S41: the control module 40 providing the built-in intelligent rule or the customized intelligent rule, uploaded from other users from the cloud server 50, and displaying on the user operation interface 401; step S42: the user choosing the intelligent rule or the customized intelligent rule through the user operation interface 401; and step S43: the intelligent device 10 executing the intelligent rule or the customized intelligent rule, and adjusting the intelligent function according to the sensing value of the at least one sensor 20 in the group anytime. In the present embodiment, when another user purchases the same intelligent device and the same data of forming a group is generated in the matching device 30, the cloud server 50 can provide the original intelligent rule and the customized intelligent rule for new users to choose from. In this way, even if the new user has just purchased a new intelligent device 10, they can directly apply the previous customized intelligent rules, which not only reduces the time and complexity for the user to input information, but also greatly improves the user's experience feeling.

In summary, the automatically matching system and method of the present invention can automatically detect surrounding intelligent devices and sensors, and make them form a group according to the same property through a matching device. Consumers do not need to manually input the data of the intelligent device and the sensor one by one, so as to save a lot of time. Next, the automatically matching system and method of the present invention can adjust more than one property at the same time, which can be more suitable and meet the requirement for users to apply in the actual environment. In addition, the users can upload the customized intelligent rule by themselves or download other intelligent rule, established from the cloud server and adjust better and more suitable parameters for the environment after adjusting. Compared with the prior art, the present invention provides a setting method and system that is simple to set up, easy to operate and can be combined with multiple intelligent devices in the group to adjust, so as to make the intelligent home system more convenient to use and improve consumption desire.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An automatically matching system for intelligent devices, comprising:
    an intelligent device, comprising at least one input property and being configured to execute an intelligent function;
    at least one sensor, comprising at least one output property, the at least one sensor being configured to output a sensing value corresponding to the at least one output property; and
    a matching device, connected to the intelligent device and the at least one sensor, the matching device being configured to receive and compare the at least one input property of the intelligent device and the at least one output property of the at least one sensor, wherein the matching device makes the intelligent device and the at least one sensor in a group when the at least one input property matches the at least one output property;
    wherein, the intelligent device in the group is configured to execute and adjust the intelligent function according to the sensing value of the at least one sensor.

2. The automatically matching system for intelligent devices of claim 1, further comprising a control module connected to the intelligent device, the at least one sensor and the matching device, the control module being configured to receive a data from the intelligent device and the at least one sensor in the group and to provide an intelligent rule according to the data, wherein the intelligent device in the group is configured to execute and adjust the intelligent function from the intelligent rule and the sensing value of the at least one sensor.

3. The automatically matching system for intelligent devices of claim 2, wherein the control module is configured to provide a user operation interface to receive the intelligent rule from the control module and display the intelligent rule for a user to adjust the intelligent rule to generate a customized intelligent rule, the intelligent device in the group is configured to execute and adjust the intelligent function according to the customized intelligent rule and the sensing value of the at least one sensor, the control module is connected to a cloud server to receive the intelligent rule corresponding to the intelligent device and the at least one sensor in the group, and the control module uploads the customized intelligent rule to the cloud server.

4. The automatically matching system for intelligent devices of claim 1, wherein the matching device matches the intelligent device and the at least one sensor in the group according to the at least one input property of the intelligent device, the at least one output property of the at least one sensor and the relative positions of the intelligent device and the sensor.

5. The automatically matching system for intelligent devices of claim 1, wherein the intelligent device and a mobile device of a user confirm the relative positions of each other through RSSI signal strength, and the intelligent device is configured to execute and adjust the intelligent function according to the relative positions of the intelligent device and the mobile device of the user.

6. The automatically matching system for intelligent devices of claim 1, further comprising a body sensor to sense a position of a user, and the intelligent device is configured to execute and adjust the intelligent function according to the position of the user sensed by the body sensor.

7. An automatically matching method for intelligent devices, comprising the following steps of:
    a matching device receiving and comparing at least one input property of an intelligent device and at least one output property of at least one sensor;

the matching device making the intelligent device and the at least one sensor in a group when the at least one input property matches the at least one output property; and the intelligent device in the group executing and adjusting the intelligent function according to the sensing value of the at least one sensor.

8. The method of claim 7, further comprising the following steps:

a control module receiving a data from the intelligent device and the at least one sensor in the group and providing an intelligent rule according to the data; and the intelligent device executing and adjusting the intelligent function according to the intelligent rule and the sensing value of the at least one sensor.

9. The method of claim 8, further comprising the following steps:

the control module displaying the intelligent rule on an user operation interface for a user to adjust the intelligent rule and the control module generating a customized intelligent rule; and the control module uploading the customized intelligent rule to a cloud server;

wherein, the intelligent device executes and adjusts the intelligent function according to the customized intelligent rule and the sensing value of the at least one sensor.

10. The method of claim 8, further comprising the following steps:

the control module uploading the data to a cloud server; and the cloud server sending the intelligent rule according to the data from the intelligent device and the at least one sensor in the group to the control module.

* * * * *